(12) United States Patent
Robertson

(10) Patent No.: US 6,601,164 B1
(45) Date of Patent: Jul. 29, 2003

(54) AUTOMATIC IDENTIFICATION OF COMPUTER SYSTEMS

(75) Inventor: Derek Robertson, Erskine (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/567,921

(22) Filed: May 10, 2000

(30) Foreign Application Priority Data

Sep. 22, 1999 (GB) ............................................. 9922539

(51) Int. Cl.$^7$ ............................................. G06F 15/177
(52) U.S. Cl. ........................................................... 713/1
(58) Field of Search ............................... 713/1, 2, 100; G06F 9/00, 15/177

(56) References Cited

U.S. PATENT DOCUMENTS

| | | | | |
|---|---|---|---|---|
| 5,305,390 A | | 4/1994 | Frey et al. ...................... | 382/2 |
| 5,742,238 A | * | 4/1998 | Fox ........................ | 340/825.49 |
| 6,020,957 A | * | 2/2000 | Rosengaus et al. ...... | 356/237.4 |
| 6,064,429 A | * | 5/2000 | Belk et al. .................. | 348/128 |
| 6,149,719 A | * | 11/2000 | Houle ...................... | 106/31.14 |

* cited by examiner

*Primary Examiner*—Dennis M. Butler
(74) *Attorney, Agent, or Firm*—Bracewell & Patterson, LLP; Carlos Munoz-Bustamante

(57) ABSTRACT

A data processing system has one or more portions which are present or absent. The variant of the data processing system is automatically determined by means of an infra-red switch whose beam is broken when the one or more portions are absent and not being detected when said one or more portions are present and is not broken when the one or more portions are present. From the output of the infra-red switch, the variant of the data processing system is determined. The variant information is then stored in the data processing system.

5 Claims, 2 Drawing Sheets

AUTOMATIC IDENTIFICATION OF COMPUTER SYSTEMS

FIELD OF THE INVENTION

The present invention relates to a system for recognising different parts or different usages of the same part used in the manufacture of different variants of data processing equipment and for automatically configuring the data processing equipment accordingly.

BACKGROUND OF THE INVENTION

In the manufacture of conventional data processing equipment such as personal computers, different variants of the same type of personal computer and different types of personal computer are frequently manufactured on the same production line. These different variants and types have differences that are inherent to the build process. As an example, the same personal computer may be available in a rack variant for fitting into a conventional standardised rack and it may also be available in a tower variant, supplied in its own enclosure. The personal computer may be shipped to the end-user as a tower variant and the end-user may purchase separately a conversion kit to enable the tower variant to be converted to a rack variant.

In the above example of a system having the same electrical characteristics being available in both tower and rack variants, the different variants have different parts such as plastic bezels or the same electrical parts, such as Light Emitting Diode (LED) panels, which are mounted in different positions during build for the two variants.

During manufacture of such systems, there are frequent misconfiguration errors due to the need for a manufacturing operator (or for an end-user) to access non-obvious jumpers to configure a system for rack use or for tower use.

U.S. Pat. No. 5,305,390 discloses a system for automatically recognising persons or objects as they move past a selected location and for classifying the person or objects in accordance with selected criteria. The system recognises multiple objects and provides statistical information as to the distribution of a parameter associated with the objects. The recognition system uses light beams reflected off the persons or objects. The patent describes a means of monitoring the profile of an object and determining compliance with known profile criteria for use in manufacturing and industrial process control. The information derived is not sent or stored in the object itself.

SUMMARY OF THE INVENTION

It is an object of the invention to provide a system and method which would recognise the difference between models of the same basic type of data processing equipment and between different types of data processing equipment and configure the data processing equipment accordingly.

The present invention provides apparatus for automatically determining the variant of a data processing system, the data processing system having one or more portions which are present or absent, the apparatus comprising: one or more means for emitting light; one or more means for detecting light from said one or more means for emitting light, the light being detected when said one or more portions are absent and not being detected when said one or more portions are present; means, responsive to said means for detecting light, for determining the variant of the data processing system; means, responsive to the means for determining the variant, for configuring the data processing system as the variant. This allows the use of a single part number for multiple variants of a data processing system, eliminates the use of jumper assemblies and allows automatic configuration of a system. Errors associated with incorrectly fitted jumpers are also eliminated.

In a first embodiment, the means for emitting and the means for detecting are part of the data processing system.

In a second embodiment, the means for emitting and the means for detecting are separate from the data processing system.

Preferably, the means for emitting is an infra-red light emitting diode and the means for detecting is an infra-red detector.

Further preferably, the means for configuring the data processing system as the variant includes a non-volatile memory.

BRIEF DESCRIPTION OF THE DRAWINGS

Embodiments of the invention will now be described, by way of example, with reference to the accompanying drawings, in which.

DETAILED DESCRIPTION OF PREFERRED EMBODIMENTS OF THE INVENTION

Figure 1:
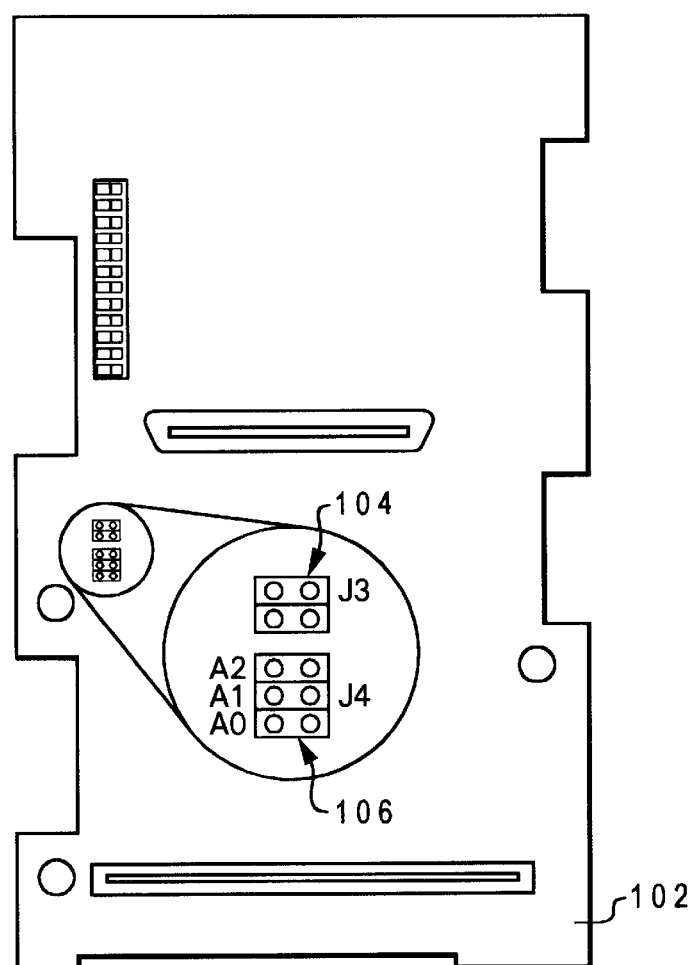
FIG. 1 shows a typical prior art jumper block arrangement.

Referring firstly to FIG. 1, a typical prior art jumper block arrangement is shown. A backplane 102 carrying components and connectors has two jumper blocks 104, 106 shown. Jumper block 106 has three jumper locations, which each have a jumper present or absent. The presence or absence of the jumper blocks is used to provide configuration information.

Figure 2:
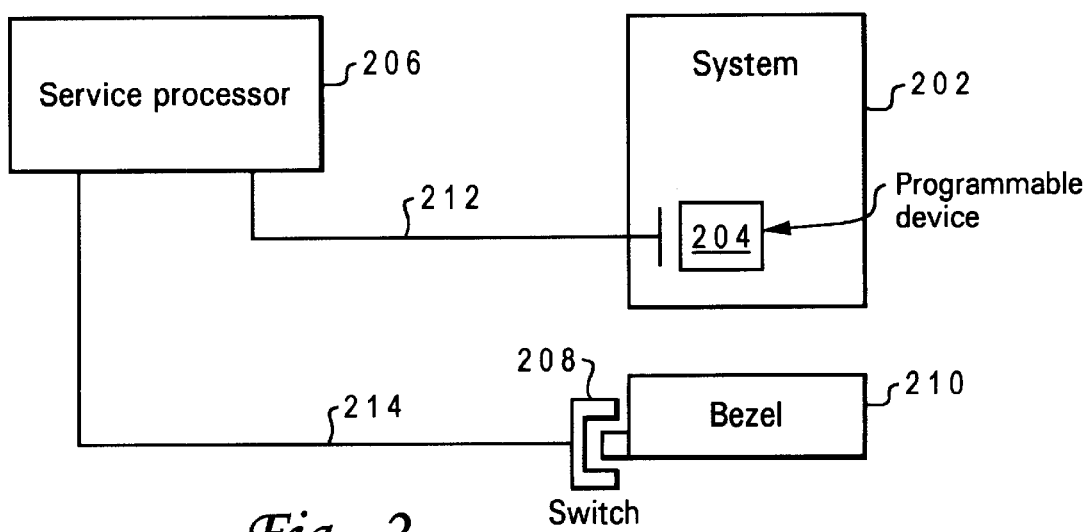
FIG. 2 is a block diagram of a system in which the present invention may be embodied.

FIG. 2 shows a block diagram of a system in which the present invention may be embodied. The motherboard 202 of the data processing system 200 includes a programmable device 204, such as a non-volatile memory. A suitable non-volatile memory for this purpose is a type PCA8550 manufactured by Philips Semiconductors Inc., which is a non-volatile 4 port device with an I²C bus interface which can be used to replace 4 jumpers. The motherboard 202 is connected by a connection 212 to a service processor 206.

A service processor 206 is a separate subsystem which monitors the server and alerts the user to problems which may arise. The service processor monitors voltages, temperatures, fan speeds and the like and alerts the user of a failure or an impending failure. The service processor also has features which allow a user to connect remotely and check the status of the machine. The service processor uses several I²C buses to connect to system monitoring chips and i/o devices. The present invention may use the service processor or it may use other dedicated hardware.

The service processor 206 is also connected by connection 214 to an infra-red switch 208 which is used to determine which variant of data processing system 200 it is installed in. Bezel 210 differs between variants of the data processing system 200. For example, there may be a rack mounting data processing system variant and a tower data processing system variant. The bezels for these differ; however, the electrical components used and the connections for these two variants may be substantially the same. It is necessary for the completed system to be aware of whether the physical enclosure it is contained within is a rack or a tower.

As an example of the need for a completed system to know whether the physical enclosure in which it is contained is a rack system or a tower system, the SCSI IDs associated with mass storage devices may differ from one variant to another. In a tower variant, it is desirable that the lowest SCSI ID is physically located at the top of the system, whilst in a rack system, the lowest SCSI ID is desirably located at the left hand side. Conventionally, this arrangement is changed by the use of jumper plug on the system backplane.

As another example, the code levels for programmable devices may change between rack and tower variants, one example would be the SAF-TE controller on the SCSI backplane. The system can recognise which model type it is and update code for this controller automatically.

The infra red switch 208 interacts with the different bezels 210 by means of the bezel having a portion of material which blocks light from the emitter of the infra-red switch reaching the receiver of the infra-red switch if the bezel 210 is of the type for a first type of system and by means of the bezel not having a portion of material so that light from the emitter of the infra-red switch does reach the receiver of the infra-red switch if the bezel 210 is of the type for a second type of system.

In an alternative embodiment, the infra-red switch 208 is a part of the component itself, such as a front panel indicator panel and the mounting location of the front panel indicator panel interacts with the indicator panel so as to identify which model the indicator panel is being fitted to.

The beam from the emitter to the receiver in the infra red switch 208 is either broken or left intact by the bezels/mountings. Multiple emitter-receiver combinations may be used to generate a bit pattern which is fed back to the service processor 206. The service processor 206 can then determine which system/model has been built and configure parts of the system which previously required hard-wired jumpers.

An example of this problem is rack and tower models of a computer server which require jumpers to be fitted differently on the DASD backplane depending on whether the model is a rack or a tower model. This means that two separate part numbers are required to manufacture these parts in production. The present invention allows a single part number to be used, eliminates the jumpers and allows for automatic configuration of the system. The present invention also eliminates errors from incorrectly fitted jumpers. Jumpers have always caused problems in manufacturing and in customer environments. The advantage of the present invention is that the system can identify its own type based on the build process, and can configure itself automatically. The process requires no manual intervention, and does not use mechanical switches, so the reliability of the solution should be high.

Figure 3:
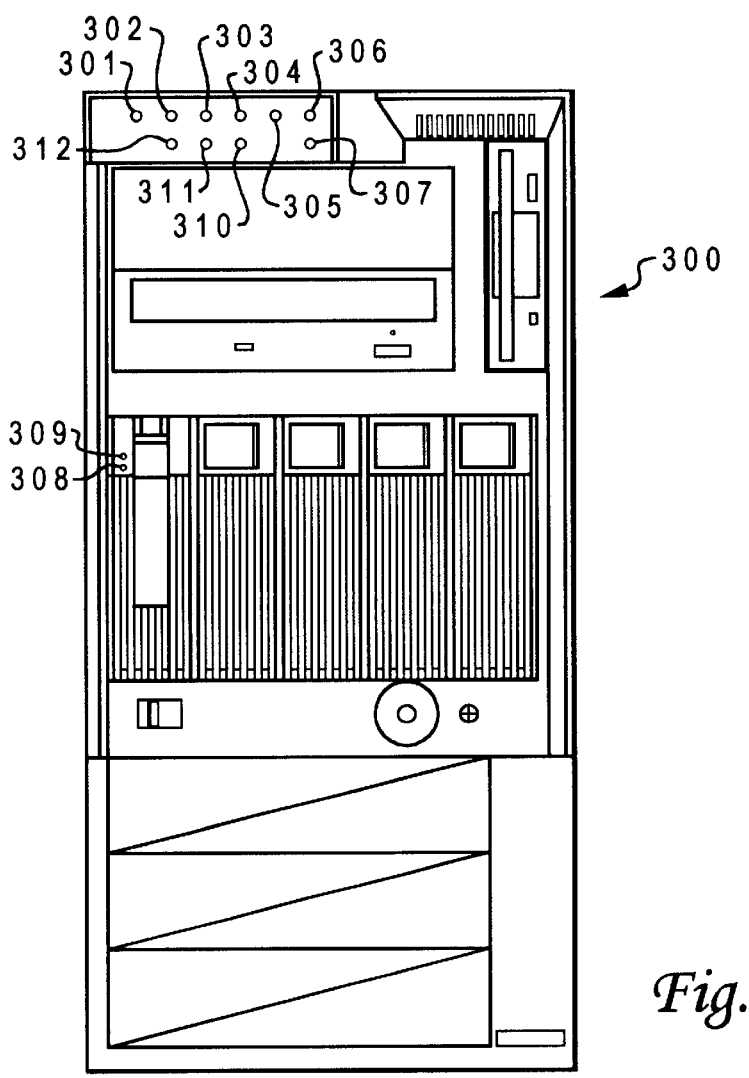
FIG. 3 shows a front panel of a tower variant of a data processing system.
Figure 4:
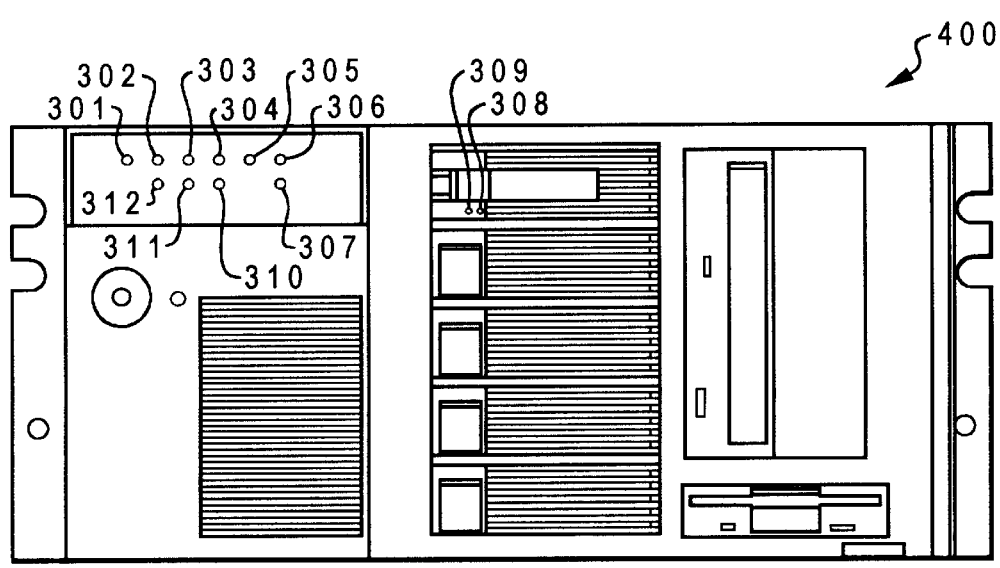
FIG. 4 shows a front panel of a rack variant of a data processing system.

An embodiment of the present invention will now be described in which an LED panel is mounted in different positions for a rack variant and for a tower variant of the same data processing system. An Infra-Red switch is used to identify the two variants. FIG. 3 shows a front panel 300 of a tower variant of a data processing system and FIG. 4 shows a front panel 400 of a rack variant of the same data processing system. Comparing FIGS. 3 and 4, the LED panel 320 can be seen in a first orientation in the tower model and in a second orientation in the rack model.

Referring to FIG. 3, the LED panel will now be described. Power-on light 301 is a green LED which blinks when the server is in Standby mode, that is when power is present, but the server is not turned on. The blinking changes to a solid (continuous) light when the server is turned on remotely (Unattended mode) or locally by pressing the Power-On switch. If this light is not on, the power cord is not connected or the power supply has failed. POST complete light 302 is a green LED that lights when the server completes the power on self test (POST) without any errors. SCSI Hard Disk Drive In-Use Light 303 is a green LED that lights when the server is accessing a SCSI device. If this light remains illuminated, it may indicate that either the SCSI bus or the system microprocessor has stopped. Primary Microprocessor Activity Light 304 blinks to indicate the activity of a microprocessor installed in the primary microprocessor socket. The LED lights during POST to indicate the presence of the primary microprocessor. Secondary Microprocessor Activity Light 305 blinks to indicate the activity of a microprocessor installed in the secondary microprocessor socket. The LED lights during POST to indicate the presence of the secondary microprocessor. When a secondary microprocessor is installed, it becomes the startup microprocessor. System Error Light 306 (Amber) shows that a system error has occurred. System errors can include high temperature, excess current or failure or errors in the microprocessor, system fan, memory, PCI bus, SCSI bus, USB, Hard disk drive, serial port, keyboard interface or power supply. When this LED is on, one or more LEDs on the system board may also be on, indicating where the error occurred. Reserved LED 307 is reserved for future use. Ethernet Transmit/Receive Activity Light 310 shows transmission and reception activity on the network. Ethernet Link Status Light 311 shows an active link connection is present on a 10BASE-T or 100BASE-TX interface. Ethernet Speed Light 312 lights when the Ethernet LAN speed is 100 Mbps. The front panel indicators described above are all located on the LED panel which is associated with the Infra-Red switch used to determine whether the system is a rack variant or a tower variant. The LED panel is located in a different orientation in each of the two variants.

Other front panel indicators include a Hard Disk Status Light (Amber) 308 which lights continuously when the server is used in a RAID environment and the drive is faulty and needs to be replaced. The hot-swappable drives can be replaced without turning off the server. Hard Disk Drive Activity Light (green) 309 lights when the hard disk drive is being accessed. These two front panel indicators are not located on the LED panel and are not associated with the Infra-Red switch used to determine whether the system is a rack variant or a tower variant.

While embodiments of the invention have been described in detail above, it will be apparent to those skilled in the art that many variations and modifications can be made to the embodiments described without departing from the scope of the invention.

What is claimed:

1. Apparatus for automatically determining the variant of a data processing system, the data processing system having one or more portions which are present or absent, the apparatus comprising:

one or more means for emitting light;

one or more means for detecting light from said one or more means for emitting light, the light being detected when said one or more portions are absent and not being detected when said one or more portions are present;

means, responsive to said means for detecting light, for determining the variant of the data processing system;

means, responsive to the means for determining the variant, for configuring the data processing system as the variant.

2. Apparatus as claimed in claim 1 wherein the means for emitting and the means for detecting are part of the data processing system.

3. Apparatus as claimed in claim 1 wherein the means for emitting and the means for detecting are separate from the data processing system.

4. Apparatus as claimed in claim 1 wherein the means for emitting is an infra-red light emitting diode and the means for detecting is an infra-red detector.

5. Apparatus as claimed in claim 1 wherein the means for configuring the data processing system as the variant includes a non-volatile memory.

* * * * *